H. ROGERS.
SHAKING AND DUMPING GRATES FOR FURNACES.
No. 193,897. Patented Aug. 7, 1877.
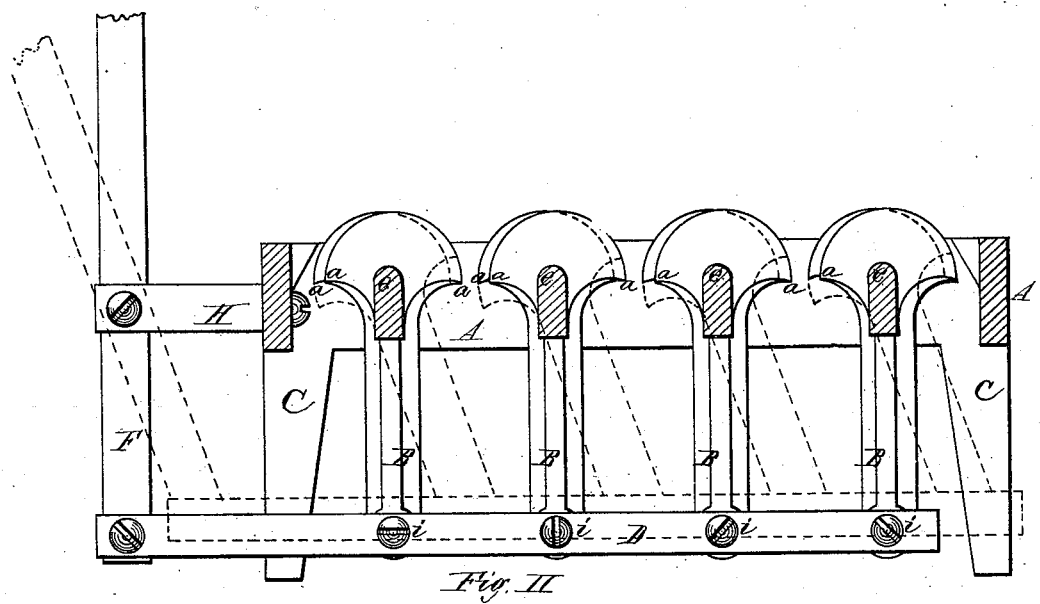
Fig. II
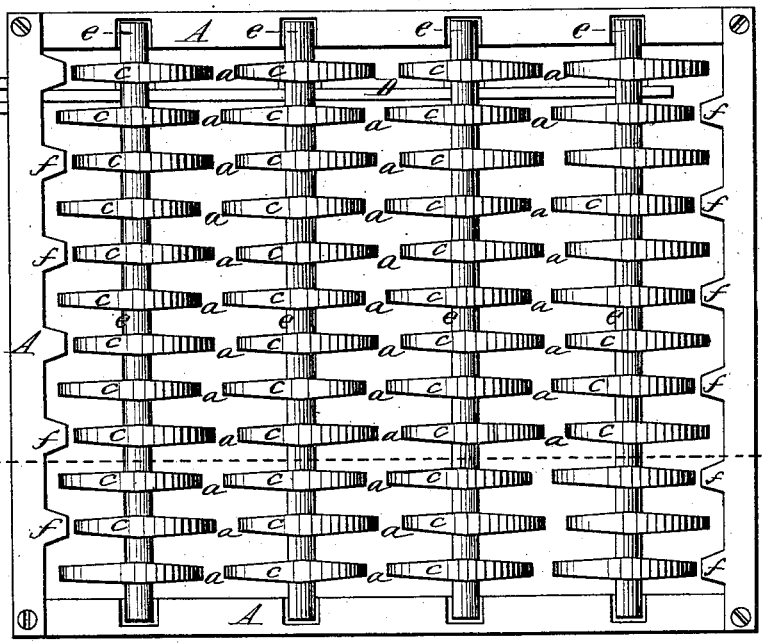
Fig. I
Witnesses—
J. A. Curtis
G. H. Blander
Inventor:
Harry Rogers

UNITED STATES PATENT OFFICE.

HARRY ROGERS, OF JANESVILLE, WISCONSIN, ASSIGNOR TO HIMSELF AND JOHN H. ROGERS.

IMPROVEMENT IN SHAKING AND DUMPING GRATES FOR FURNACES.

Specification forming part of Letters Patent No. 193,897, dated August 7, 1877; application filed February 12, 1877.

*To all whom it may concern:*

Be it known that I, HARRY ROGERS, of Janesville, in the State of Wisconsin, have invented a new and useful Improved Shaking and Dumping Grate for Furnaces, &c; and that the following is a full, clear, and exact description thereof, reference being had to the accompanying drawings, making a part of this specification, and to the letters of reference marked thereon.

The object of my invention is to provide a shaking and dumping grate for furnaces that may be moved easily to shake out and clear the ashes and cinders from the fire, and which may be also operated to dump out entirely the contents of the fire-box into the ash-pit below; and to this end my invention consists of a series of rock-shafts, held in suitable bearings, each shaft provided with a series of fingers or bars made circular on the top, and forming the grate-surface and eccentric with the shaft in a horizontal direction, and with the bars in each series alternating with each other in their location upon the shaft, and the several series so arranged that the ashes and cinders may be shaken from the fire, or the whole contents of the fire-box dumped into the ash-pit below, as will be more fully hereinafter explained.

Figure I is a plan view of the grate, showing the arrangement and position of the bars, and Fig. II is a vertical section of the same at line I.

In the drawings, A represents a frame, which may be supported upon legs C in the ash-pit of a furnace, or the frame may be secured to the inside of the ash-pit or fire-box by suitable bolts, and at proper distances apart the rock-shafts $e$ may have their bearings in recesses made in opposite sides of the frame A. Upon each rock-shaft $e$ is arranged a series of bars, $c$, made circular upon the top, and alternating with each other in their location upon the shaft $e$—that is to say, the first bars in each series are located eccentrically upon all the shafts, and more upon the same side of each shaft than the other, and the next bars in the series are all located upon the opposite sides of the respective shafts, and the next bars are located like the first, and so on, all the bars in the different series alternating with the next ones in their location upon their respective shafts, so that the line between the bars of two adjacent series is a broken or zigzag line instead of being straight and parallel with the rock-shafts themselves, as is clearly shown in Fig. I.

The corresponding bars in the different series should be about one-fourth of an inch apart to operate properly, and the bars are made circular on top, and cut away on their lower sides, so that the bars themselves are of the form of a half circle, or approximating thereto, with the circular side uppermost, as shown in Fig. II.

Extending down from each rock-shaft $e$ is an arm, B, (shown in Fig. II,) and these are connected at $i$ to a rod, D, which is pivoted to an upright lever, F, and this, when moved to and fro, gives the arms B and rock-shafts $e$ a vibrating or partial rotary movement.

When a short movement is given to this lever F the rock-shaft and bars $c$ are given a rocking motion sufficient to disturb the fire-surface, and cause the ashes to be loosened and shaken out; but if a longer movement is given to the lever F and rod D the points $a$ of two adjacent bars $c$ are moved, one upward and the adjacent one downward, so that a space is left between each two adjacent series of bars $c$ sufficient to permit the whole contents of the fire-box to be dumped or shaken through into the ash-pit below by a few movements of the lever F.

The ends of the frame A may be provided with projections $f$, extending inward, to fill the space between the frame and the short ends of the bars $c$, to prevent the coal or fire from falling through, as shown in Fig. I, or instead of such projections all the bars $c$ nearest each end of the frame may be made of the same length, with sufficient space between the bars and the frame to furnish the proper amount of air to the fire, and yet prevent the coal from falling through.

The fulcrum H, to which the lever F is attached, may be secured to the outside of the furnace or to the frame, or secured in any permanent manner.

It is, of course, evident that the frame A may be omitted in practice, provided suitable bearings or recesses can be made in the sides of the fire-box or in the iron connected therewith.

I am aware that grate-bars have heretofore been made having their upper surfaces made eccentric with the pivot in a vertical direction; but, as they were not eccentric in a horizontal direction, the disturbance of the fire when they were operated occurred in straight parallel lines instead of in irregular or broken lines, and their operation was totally different.

I am also aware that a series of shafts have been provided with series of alternating straight horizontal fingers or bars, as shown in patent to M. M. Rounds of March 12, 1861.

I do not, therefore, claim a series of grate-bars irrespective of my construction and arrangement of the same; but Having described my invention, what I do claim is—

The combination of the rock-shafts $e\ e$, resting and operating in suitable bearings, the series of grate-bars $c\ c$, made circular on their upper sides, and eccentric horizontally with and upon said rock-shafts, so that the bars upon each shaft alternate with each other in their location upon the shaft, the arms B and the connecting-rod D, by means of which the whole series of bars are operated, all substantially as herein described.

HARRY ROGERS.

Witnesses:
T. A. CURTIS,
G. H. BLANDEN.